United States Patent
Wittmeier et al.

(10) Patent No.: US 12,235,502 B2
(45) Date of Patent: Feb. 25, 2025

(54) ORGANIZER ASSEMBLIES FOR FIBER OPTIC CLOSURES

(71) Applicant: AFL Telecommunications LLC, Duncan, SC (US)

(72) Inventors: David Wittmeier, Greer, SC (US); Cecilia Stout, Taylors, SC (US); Will Miller, Easley, SC (US)

(73) Assignee: AFL Telecommunications LLC, Duncan, SC (US)

( * ) Notice: Subject to any disclaimer, the term of this patent is extended or adjusted under 35 U.S.C. 154(b) by 293 days.

(21) Appl. No.: 17/767,312

(22) PCT Filed: Oct. 8, 2020

(86) PCT No.: PCT/US2020/054708
§ 371 (c)(1),
(2) Date: Apr. 7, 2022

(87) PCT Pub. No.: WO2021/072025
PCT Pub. Date: Apr. 15, 2021

(65) Prior Publication Data
US 2022/0365304 A1 Nov. 17, 2022

Related U.S. Application Data

(60) Provisional application No. 62/912,386, filed on Oct. 8, 2019.

(51) Int. Cl.
*G02B 6/44* (2006.01)
(52) U.S. Cl.
CPC ......... *G02B 6/4452* (2013.01); *G02B 6/4455* (2013.01)
(58) Field of Classification Search
CPC ............. G02B 6/4442; G02B 6/4452; G02B 6/44524; G02B 6/4455; G02B 6/4453; G02B 6/4454
See application file for complete search history.

(56) References Cited

U.S. PATENT DOCUMENTS

2007/0047895 A1  3/2007  Parikh
2016/0238811 A1  8/2016  Simmons

FOREIGN PATENT DOCUMENTS

| CA | 3100340 A1 | * | 11/2019 | ........... G02B 6/4442 |
| CA | 3153783 A1 | * | 4/2021 | ........... G02B 6/4442 |

(Continued)

OTHER PUBLICATIONS

International Search Report Corresponding to Application No. PCT/US2020/054708 on Dec. 8, 2020; 2 pages.

*Primary Examiner* — Jerry Rahll
*Assistant Examiner* — Mary A El-Shammaa
(74) *Attorney, Agent, or Firm* — Dority & Manning, P.A.

(57) ABSTRACT

An organizer assembly includes a primary basket extending along a longitudinal axis between a first open end and a second closed end. The organizer assembly includes a backplate extending between a front wall and a rear wall, wherein a plurality of entry/exit slots are defined at the rear wall. The backplate further includes a plurality of positioning assemblies. The organizer assembly includes a hinge assembly connecting the backplate to the primary basket, wherein the backplate is rotatable relative to the primary basket at the hinge assembly about a lateral axis. The organizer assembly includes a plurality of organizer trays, each of the plurality of organizer trays rotatably connectable to the backplate at one of the plurality of positioning assemblies. Each of the plurality of positioning assemblies causes the connected one of the plurality of organizer trays to be selectively positionable in one of a plurality of rotational positions.

20 Claims, 16 Drawing Sheets

(56) References Cited

FOREIGN PATENT DOCUMENTS

| EP | 0997758 A2 | 5/2000 |
|---|---|---|
| WO | WO2012155359 A1 | 11/2012 |
| WO | WO-2023091635 A1 * | 5/2023 |

* cited by examiner

ORGANIZER ASSEMBLIES FOR FIBER OPTIC CLOSURES

PRIORITY STATEMENT

This application is a National Stage Patent Application of PCT/US2020/054708, filed on Oct. 8, 2020, which claims the benefit of priority to U.S. Provisional Patent Application Ser. No. 62/912,386, filed on Oct. 8, 2019, the disclosures of all of which are incorporated by reference herein in their entireties.

FIELD

The present disclosure relates generally to closures, such as for fiber optic cable connections, and more specifically to improved organizer assemblies for fiber optic closures.

BACKGROUND

Certain closures, also referred to as "butt" or "domed" closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

Many fiber organizer assemblies utilized in known butt closures generally use large trays with high capacities. However, single element/single circuit ("SE/SC") trays are also advantageous due to their smaller sizes. These trays can be utilized to isolate individual customers. Closures which utilize SE/SC tray types, however, are typically not flexible and provide minimal slack storage.

Accordingly, improved organizer assemblies for use with butt closures would be advantageous. Specifically, organizer assemblies which address one or more of the above-stated deficiencies would be advantageous.

BRIEF DESCRIPTION

Aspects and advantages of the invention will be set forth in part in the following description, or may be obvious from the description, or may be learned through practice of the invention.

In accordance with one embodiment, an organizer assembly for a butt closure is provided. The organizer assembly defines a mutually orthogonal coordinate system including a longitudinal axis, a lateral axis, and a transverse axis. The organizer assembly includes a primary basket extending along the longitudinal axis between a first open end and a second closed end, the primary basket defining an interior. The organizer assembly further includes a backplate extending between a front wall and a rear wall, wherein a plurality of entry/exit slots are defined at the rear wall. The backplate further includes a plurality of positioning assemblies. The organizer assembly further includes a hinge assembly connecting the backplate to the primary basket, wherein the backplate is rotatable relative to the primary basket at the hinge assembly about the lateral axis. The organizer assembly further includes a plurality of organizer trays, each of the plurality of organizer trays rotatably connectable to the backplate at one of the plurality of positioning assemblies. Each of the plurality of positioning assemblies causes the connected one of the plurality of organizer trays to be selectively positionable in one of a plurality of rotational positions.

In accordance with another embodiment, an organizer assembly for a butt closure is provided. The organizer assembly defines a mutually orthogonal coordinate system including a longitudinal axis, a lateral axis, and a transverse axis. The organizer assembly includes a primary basket extending along the longitudinal axis between a first open end and a second closed end, the primary basket defining an interior. The organizer assembly further includes a backplate extending between a front wall and a rear wall, wherein a plurality of entry/exit slots are defined at the rear wall. The organizer assembly further includes a hinge assembly connecting the backplate to the primary basket, wherein the backplate is rotatable relative to the primary basket at the hinge assembly about the lateral axis and selectively positionable in one of a plurality of rotatable positions. The organizer assembly further includes a plurality of organizer trays, each of the plurality of organizer trays rotatably connectable to the backplate and rotatable about the lateral axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
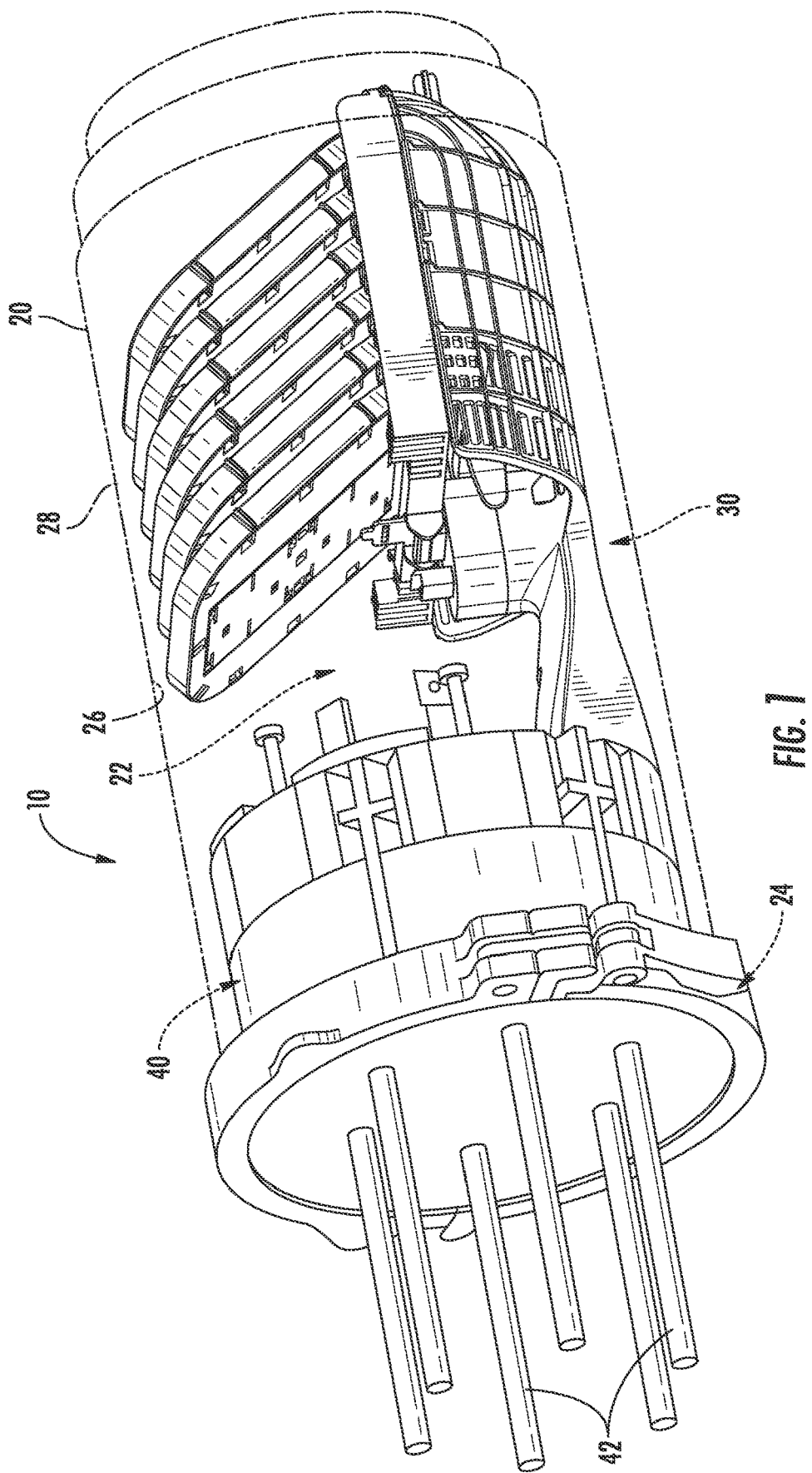
FIG. 1 is a perspective view of a butt closure in accordance with embodiments of the present disclosure.
Figure 2:
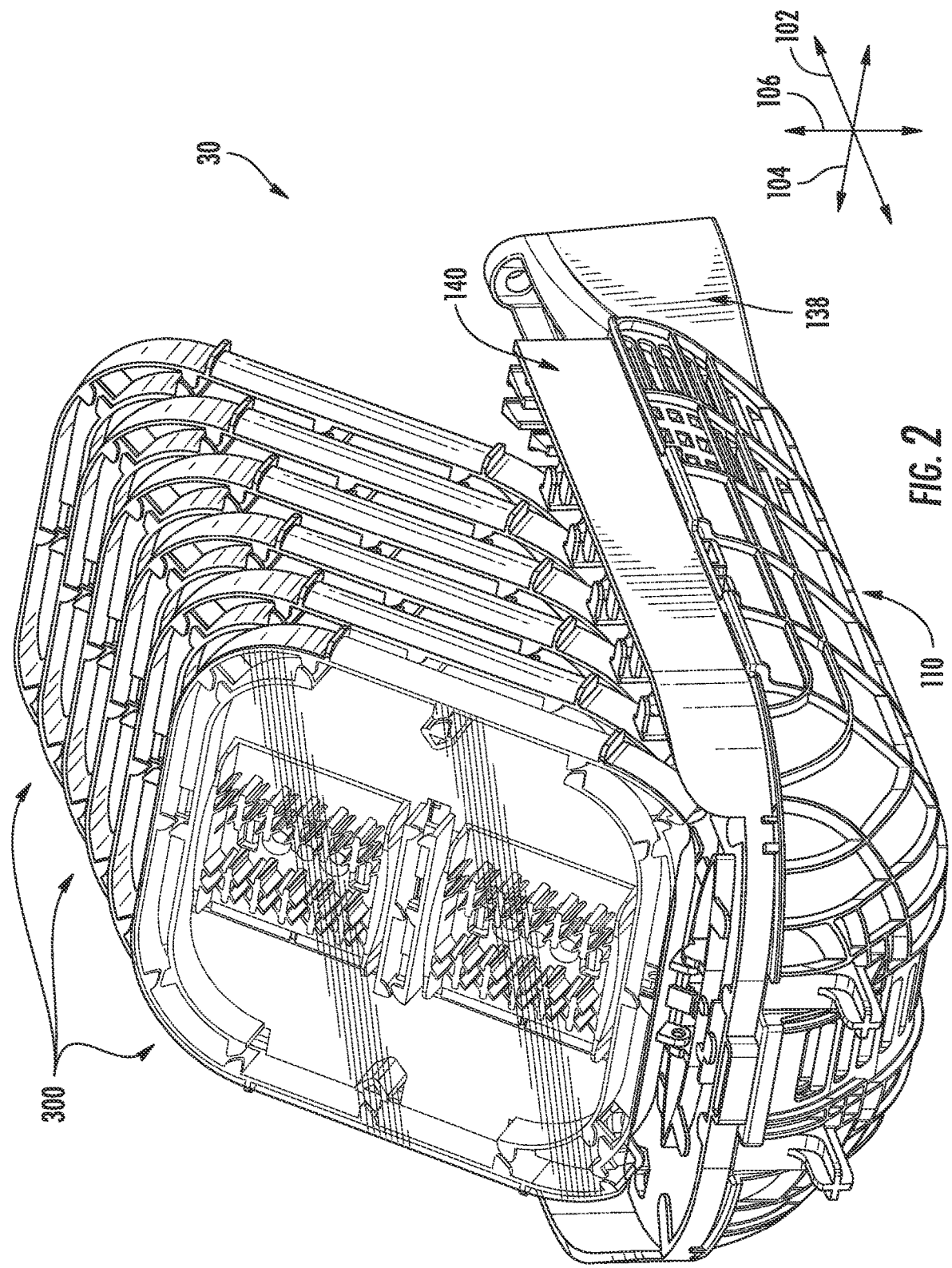
FIG. 2 is a front perspective view of an organizer assembly, with a backplate in a closed position and a plurality of organizer trays in rear positions, in accordance with embodiments of the present disclosure.
Figure 3:
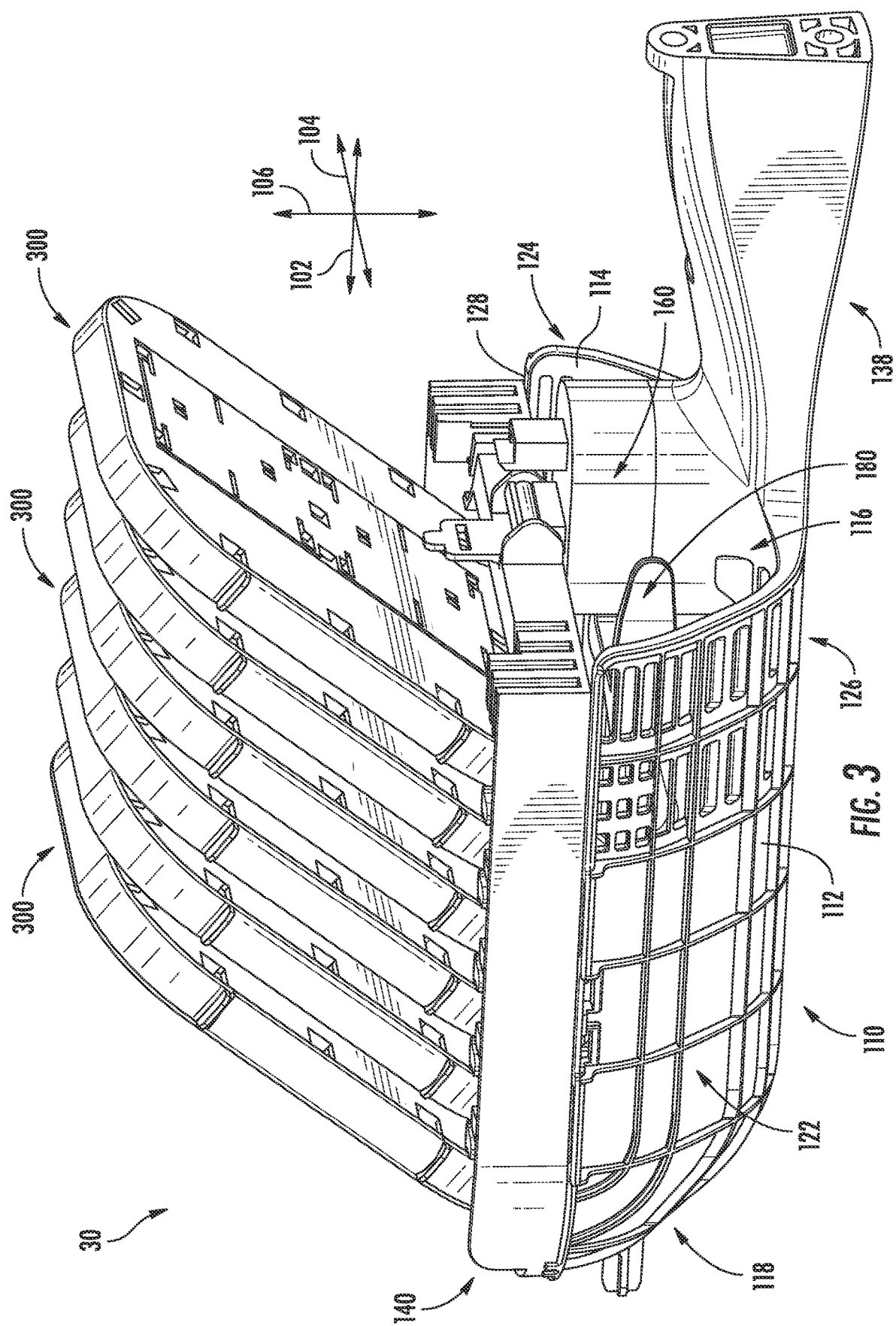
FIG. 3 is a rear perspective view of an organizer assembly, with a backplate in a closed position and a plurality of organizer trays in rear positions, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 16, embodiments of butt closures 10 and organizer assemblies in accordance with the present disclosure are provided. Closures 10 in accordance with the present disclosure, and in particular the organizer assemblies thereof, may advantageously provide improved routing and storage features. Additionally or alternatively, closures 10 and organizer baskets thereof in accordance with the present disclosure may advantageously provide improved features for securing and positioning organizer trays and backplates thereof in a variety of positions, thus advantageously allowing efficient and effective fiber-populating, splicing, etc. Additionally or alternatively, closures 10 and organizer baskets thereof in accordance with the present disclosure, and in particular the splice modules which may be utilized with such closures 10 and/or organizer baskets, may advantageously provide improved flexibility with respect to the types of splices and/or other components that can be held therein.

Referring now to FIG. 1, a closure 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 300 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 300 of the organizer assembly 30.

FIGS. 2 through 16 illustrate various embodiments of organizer assemblies 30 and components thereof in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106.

Referring now to FIGS. 2 through 13, organizer assemblies 30 in accordance with the present disclosure may include a primary basket 110. The primary basket 110 generally forms at least a portion of the base exterior of the organizer assembly 30, and includes an exterior surface 112 and an interior surface 114. The primary basket 110 may extend along the longitudinal axis 102 between a first end 116 and a second end 118. The first end 116 may be an open end, as shown, such that cables 42 or transmission elements thereof being directed along and parallel to the longitudinal axis 102 can enter or exit an interior 120 of the primary basket 110 through the first end 116. The second end 118 may be a closed end, as shown, such that cables 42 or transmission elements thereof being directed along and parallel to the longitudinal axis 102 cannot enter an interior 120 of the primary basket 110 through the second end 118, and instead encounter a surface of the primary basket 110.

The primary basket 110 may further extend along the lateral axis 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the closure 10 and organizer assembly 30 thereof.

Primary basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the primary basket 110, such as along the sides 122, 124 and second end 118.

A connector shaft 138 may extend from the first end 116 along the longitudinal axis 102, such that at least a portion of the connector shaft 138 is exterior to the primary basket 110. The connector shaft 138 may connect to the base 40, thus connecting the organizer assembly 30 and base 40 together.

Figure 10:
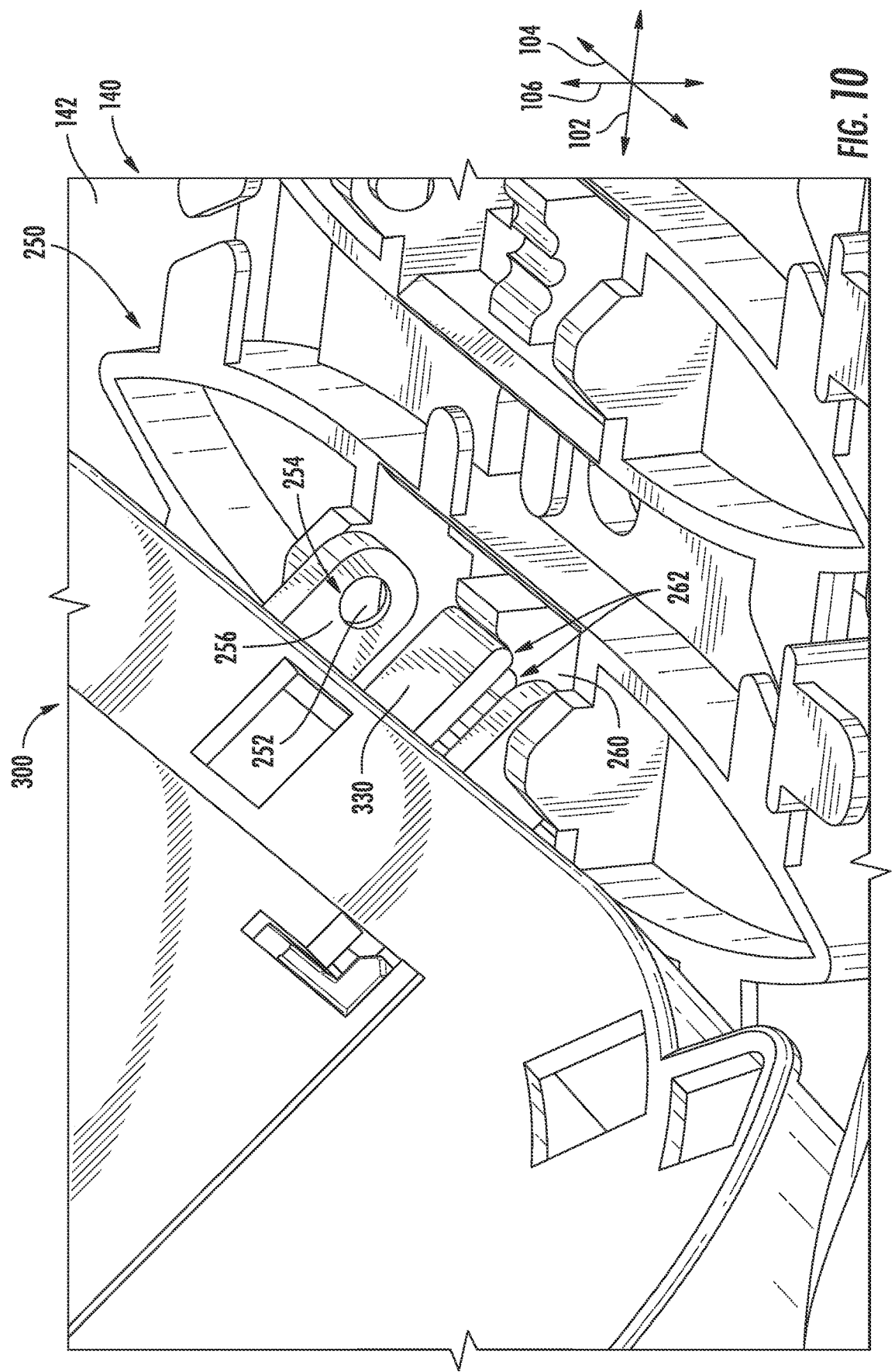
FIG. 10 illustrates an organizer assembly interacting with an associated positioning assembly to be selectively positioned in a forward position, in accordance with embodiments of the present disclosure.
Figure 11:
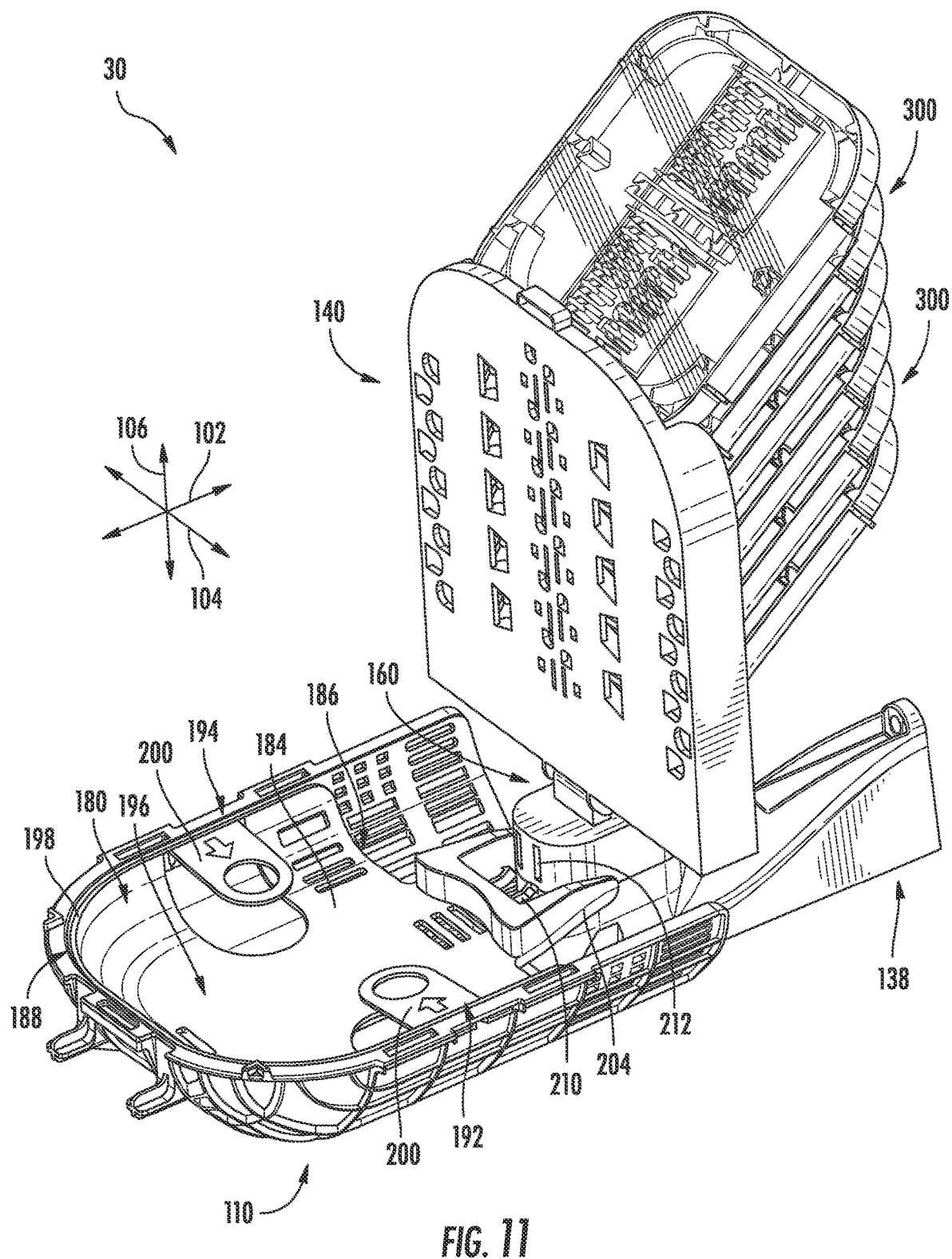
FIG. 11 is a front perspective view of an organizer assembly, with a backplate in an open position, in accordance with embodiments of the present disclosure.
Figure 12:
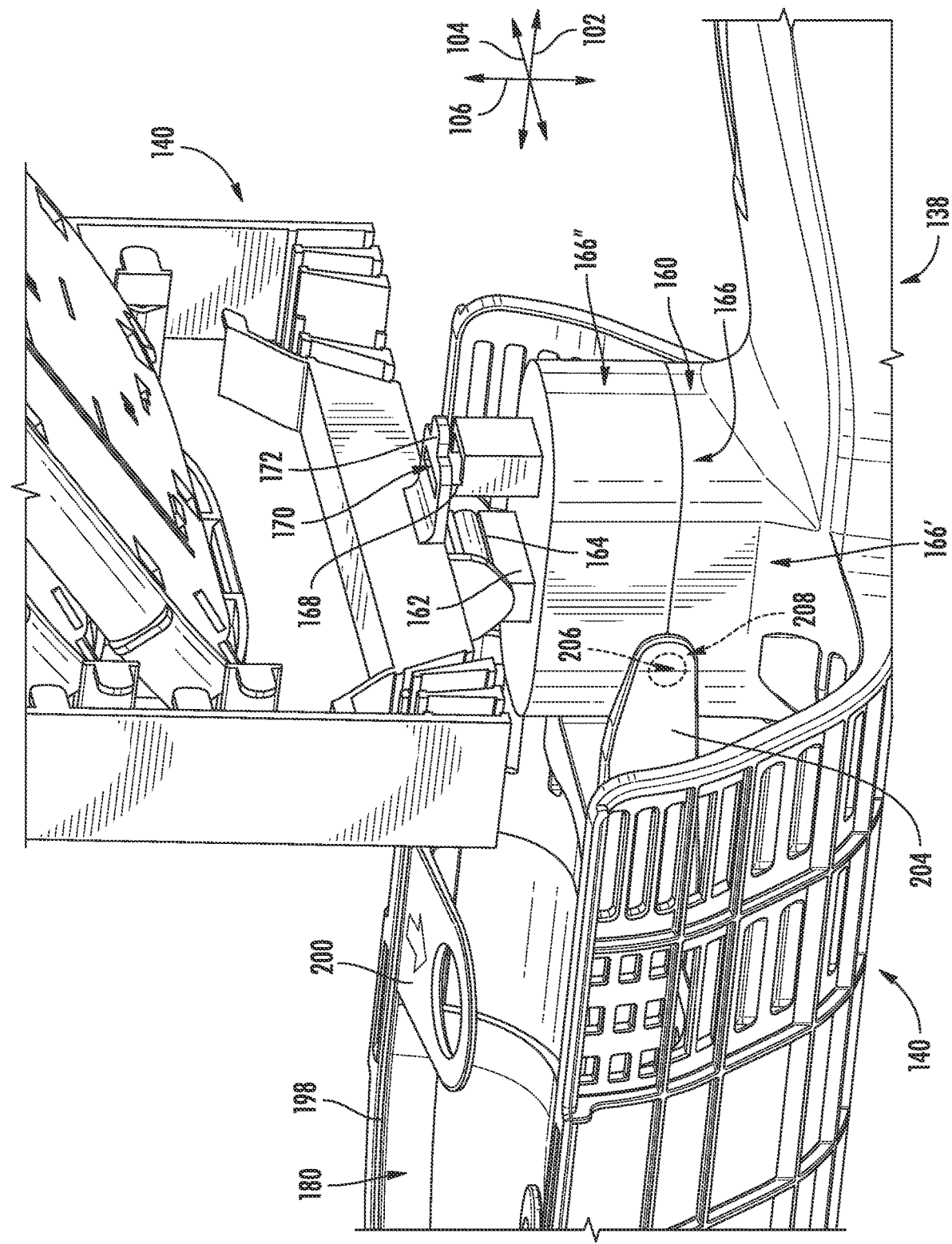
FIG. 12 illustrates a hinge assembly interacting with a backplate such that the backplate is selectively positioned in an open position, in accordance with embodiments of the present disclosure.
Figure 13:
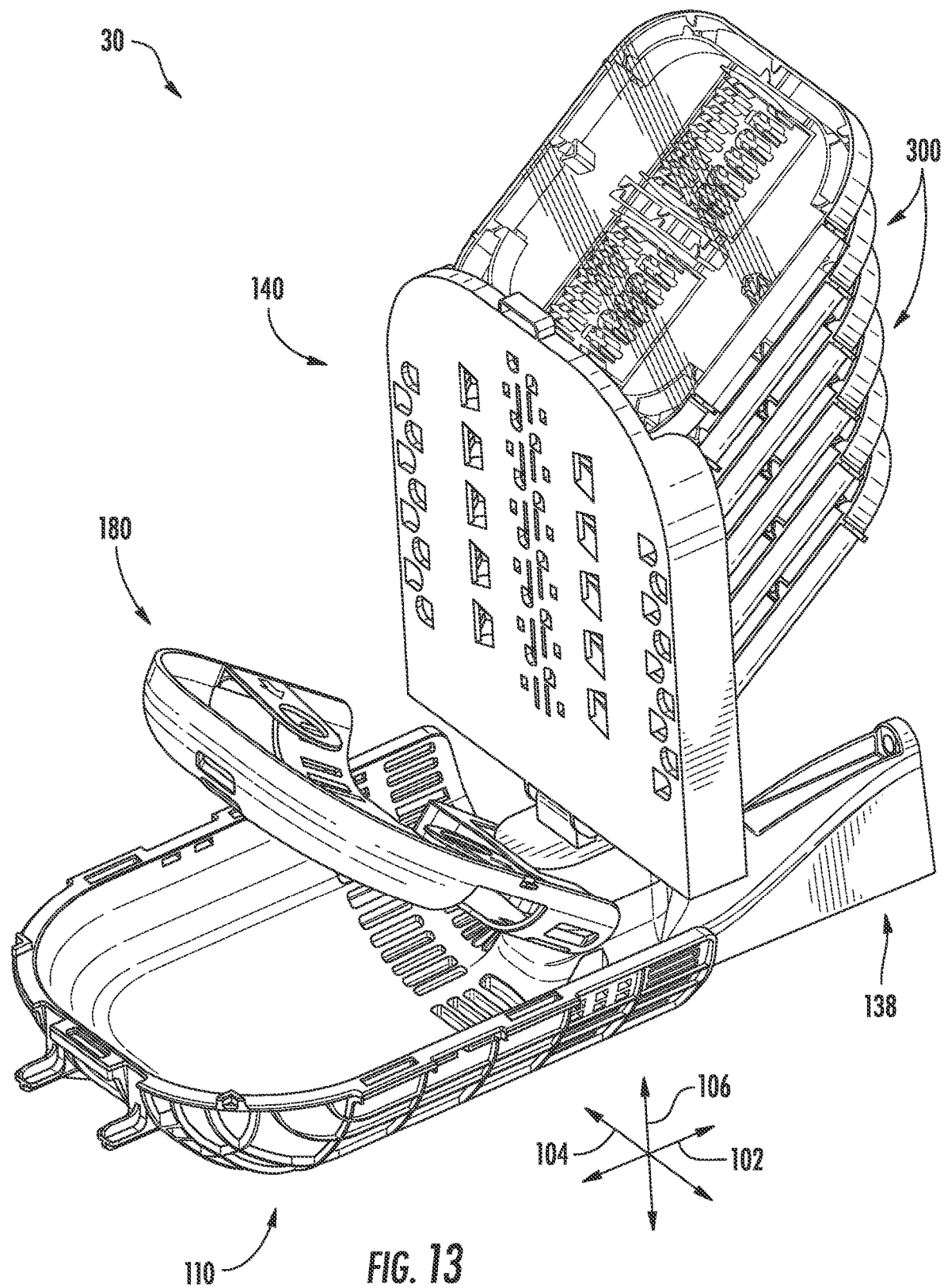
FIG. 13 is a front perspective view of an organizer assembly, with a secondary basket rotated such that catch arms are inserted in slots defined in a hinge assembly, in accordance with embodiments of the present disclosure.

Organizer assemblies 30 in accordance with the present disclosure may further include a backplate 140. Backplate 140 may be rotatably connected to the primary basket 110, such as by a hinge assembly as discussed herein. Backplate 140 may be rotatable relative to the primary basket 110, such as at the hinge assembly. In exemplary embodiments, the backplate 140 may be rotatable about the lateral axis 104. In exemplary embodiment the backplate 140 may be selectively positionable in one of a plurality of rotatable positions, as discussed herein. For example, in exemplary embodiments, backplate 140 may be rotatable between a closed position, as illustrated in FIGS. 2 through 10, and an open position, as illustrated in FIGS. 11 through 13. In the closed position, the backplate 140 may extend (from a rear end to a front wall thereof as discussed herein) along the longitudinal axis 102. In the open position, the backplate 140 may extend (from the rear end to the front wall thereof) along the transverse axis 106.

Backplate 140 may be positioned above the primary basket 110 along the transverse axis 106. For example, in exemplary embodiments, backplate 140 may be entirely above the primary basket 110. As illustrated in FIGS. 2 through 10, in some embodiments, the backplate 140 when selectively positioned in the closed position, contacts the primary basket 140, such as the peripheral lip 128 thereof.

Backplate 140 may include a base wall 142, a first sidewall 144, a second sidewall 146, and a front wall 148, and a rear wall 150. First sidewall 144 and second sidewall 146 may be spaced apart along the lateral axis 104. Front wall 148 and rear wall 150 may be spaced apart (such as along the longitudinal axis 102 when in the closed position or along the transverse axis 106 when in the open position). Backplate may thus extend between the sidewalls 146, 148 along the lateral axis 104 and between the front and rear walls 148, 150, such as along the longitudinal axis 102 when in the closed position or along the transverse axis 106 when in the open position.

A plurality of entry/exit slots 152 may be defined at and through the rear wall 150, such as proximate the first sidewall 144 and/or second sidewall 146. Cables 42 or transmission elements thereof can enter or exit an interior of the backplate 140 through the entry/exit slots 152. In some embodiments, one or more plugs 154 are provided. Each plug 154 may be removably inserted into one of the entry/exit slots 152 to secure cables 42 or transmission elements extending through the entry/exit slots 152 therein. In exemplary embodiments, plugs 154 may be formed from a rubber.

Retainer tabs 156 may extend into the interior of the backplate from the first sidewall 144, second sidewall 146, front wall 148, and/or base wall 142 (e.g. proximate the first sidewall 144, second sidewall 146, and/or front wall 148) to guide and retain such cables 142 or transmission elements thereof.

An organizer assembly 30 in accordance with the present disclosure may further include a hinge assembly 160 which connects the backplate 140, such as at the rear wall 150 thereof, to the primary basket 110, such as at the first end 116 thereof. Backplate 140 may be rotatable relative to the primary basket 110 at the hinge assembly 160, such as about the lateral axis 104.

Hinge assembly 160 may, for example, include latch 162 which rotatable receives an axle 164 of the backplate 140. The axle 164 may, for example, be connected to the rear wall 150 of the backplate 140. Hinge assembly 160 may further include a base 166 which extends, such as along the transverse axis 106, from the basket 110 (such as at the first end 116 thereof). The latch 162 may extend from the base 166.

In some embodiments, base 166 may be formed from multiple components, such as a basket component 166' and a backplate component 166". Basket component 166' may, for example, be integral with the basket 110 such that they are formed as a single, unitary structure. Backplate component 166" may be connected to the basket component 166' to form the base 166. Alternatively, the base 166 may be a single, unitary structure, which may for example be integral with the basket 110 such that they are formed as a single, unitary structure.

As discussed, the backplate 140 is selectively positionable in one of a plurality of rotatable positions, such as an open position and a closed position. In exemplary embodiments, the hinge assembly 160 may include a catch 168 which is selectively insertable into a slot 170 of the backplate 140. Catch 168 may extend, such as along the transverse axis 106, from the base 166. Slot 170 may, for example, be defined in a tab 172 which extend from the rear wall 150 of the backplate 140. In exemplary embodiments, when the backplate 140 is positioned in the open position, the catch 168 may be inserted in the slot 170. Such interaction of the catch 168 with the slot 170 may selectively position and secure the backplate 140 in the open position. Additionally, in the open position the backplate 140 may be spaced from the basket 110, such as from the peripheral lip 128 thereof. When the backplate 140 is positioned in the closed position, the catch 168 may be removed from the slot 170, and may contact the basket 110, such as the peripheral lip 128 thereof.

Figure 5:
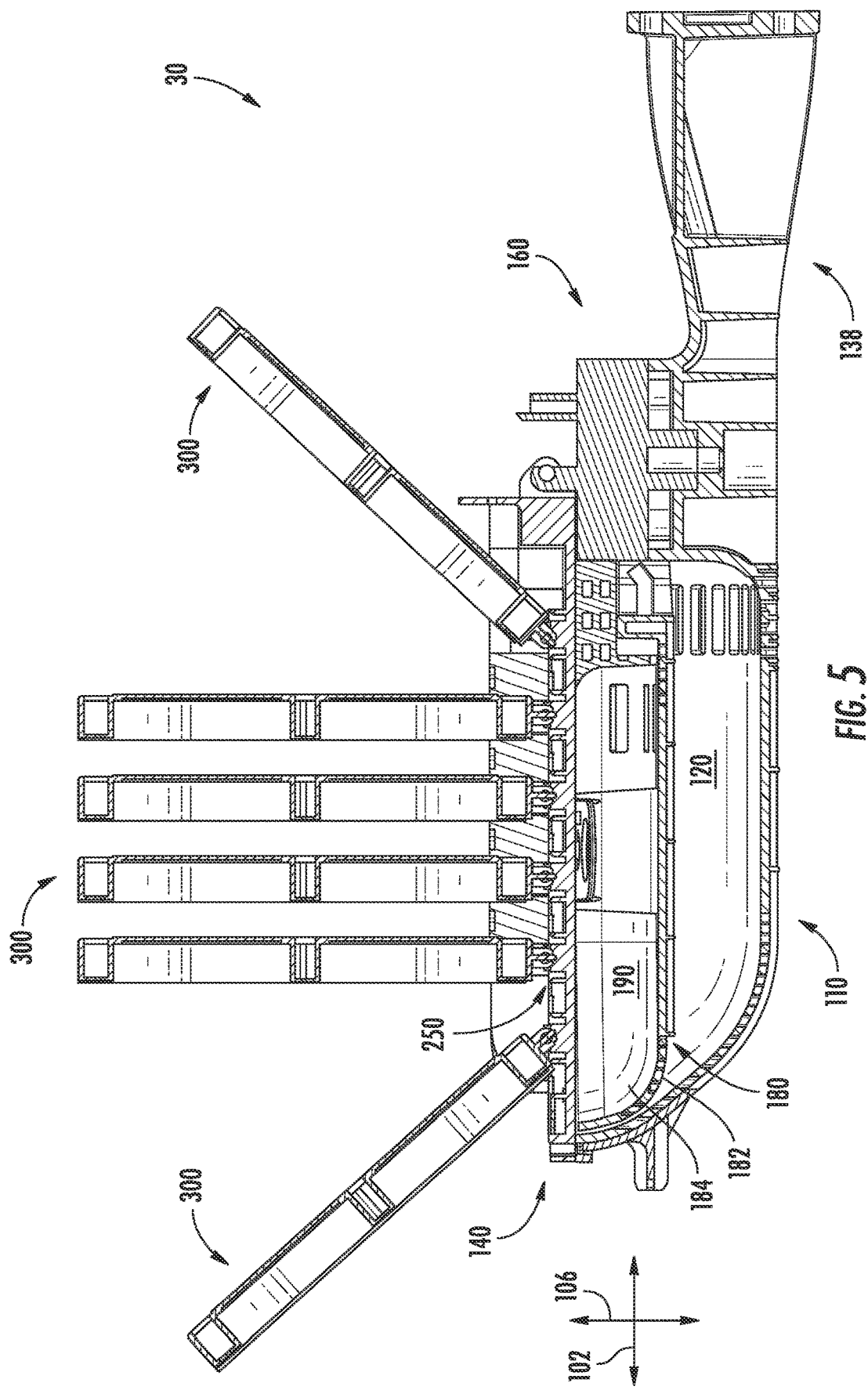
FIG. 5 is a cross-sectional view of an organizer assembly, with organizer trays in rear, intermediate, and forward positions, in accordance with embodiments of the present disclosure.

As shown in FIGS. 5 and 11 through 13, organizer assemblies 30 in accordance with the present disclosure may include a second basket 180 which may be rotatably and removably connectable to the hinge assembly 160. The secondary basket 180 as shown is rotatably connected to the hinge assembly 160. In exemplary embodiments, the secondary basket 180 may be connected to the hinge assembly 160 below the below the backplate 140 along the transverse axis 106, such as between the backplate 140 and the interior surface 114 of the primary basket 110 along the transverse axis 106. The secondary basket 180 may be rotatable between a first position wherein the secondary basket 180 is aligned along the longitudinal axis 102 (as shown in FIGS. 5, 11, and 12) and a second position wherein the secondary basket 180 is aligned at an angle between the longitudinal axis 102 and transverse axis 106 (as shown in FIG. 13). In exemplary embodiments, the secondary basket 180 may be removable, such that it can be utilized as needed for cable 42 (and transmission elements thereof) routing and set aside/discarded when not needed.

The secondary basket 180 includes an exterior surface 182 and an interior surface 184. The secondary basket 180 may extend (such as along the longitudinal axis 102 when in the first position) between a first end 186 and a second end 188. The first end 186 may be an open end, as shown, such that cables 42 or transmission elements thereof being directed along and parallel to the longitudinal axis 102 can enter or exit an interior 190 of the secondary basket 180 through the first end 186, when the secondary basket 180 is in the first position. The second end 188 may be a closed end, as shown, such that cables 42 or transmission elements thereof being directed along and parallel to the longitudinal axis 102 cannot enter an interior 190 of the secondary basket 180 through the second end 188, and instead encounter a surface of the primary basket 110, when the secondary basket 180 is in the first position.

The secondary basket 180 may further extend along the lateral axis 104 between a first side 192 and a second side 194, both of which may be closed (as discussed above with respect to second end 118). In exemplary embodiments, a length between the first end 186 and second end 188 is greater than a length between the first side 182 and the second side 184. Further, in exemplary embodiments, transitions between the closed second end 188 portion and a base portion 196, the closed first side portion 192 and the base portion 196, the closed second side portion 194 and the base portion 196, the closed second end 188 portion and closed first side portion 192, and/or the closed second end 188 portion and closed second side portion 194 are curved.

In exemplary embodiments, the area of the interior 190 may be less than the area of the interior 120, the length between the first end 186 and second end 188 may be less than the length between the first end 116 and second end 118, and/or the length between the first side 182 and second side 184 is less than the length between the first side 122 and second side 124, such that the secondary basket 180 can fit at least partially, and in some embodiments fully, within the primary basket 110 (such as the interior 120 thereof).

Secondary basket 180 may further include an upper peripheral lip 198, which may extend between the first end 186 and second end 188, such as on the sides 192, 194, and may further extend between the sides 192, 194, such as along the closed second end 188. For example, the lip 198 may extend along an upper edge (along the traverse axis 106) of the secondary basket 180, such as along the sides 192, 194 and second end 188.

In some embodiments, basket 180 may further include a plurality of retainer tabs 200, each of which extends from the basket 180 into the interior 190. The tabs 200 may be connected to the basket 180 at the upper edge of the basket 180, such as adjacent the lip 198. Tabs 200 may generally assist in routing and retaining cables 42 and transmission elements in the interior 190 during assembly, splicing, etc., thereof.

One or more connector arms 204 may extend from the first end 186 (such as along the longitudinal axis 102 when the secondary basket 180 is in the first position). The connector arms 204 may be removably connected to the hinge assembly 160, such as the base 166 thereof, thus rotatably connecting the secondary basket 180 thereto. For example, protrusions 206 provided on the arms 204 may be inserted in depressions 208 defined in the base 166 to rotatably connect the secondary basket 180 thereto.

In some exemplary embodiments, the secondary basket 180 may further include one or more catch arms 210. Catch arms 210 may, for example, extend from the first end 186. Each catch arm 210 may be selectively insertable into a slot 212 defined in the hinge assembly 160, such as in the base 166. For example, in the first position, the catch arms 210 may be removed from the slots 212. In the second position, the catch arms 210 may be inserted into the slots 212. Positioning of the catch arms 210 in the slots may allow the secondary basket 180 to be selectively positioned in the second position.

Referring now generally to FIGS. 2 through 14, organizer assemblies 30 in accordance with the present disclosure may further include one or more organizer trays 300, such as in exemplary embodiments a plurality of organizer trays 300.

Each organizer tray 300 is rotatably connectable, and thus may be rotatably connected, to the backplate 140, such as to a positioning assembly of the backplate 140 as discussed herein. Each organizer tray 300 may be rotatable, such as about the lateral axis 104. Further, in exemplary embodiments, each organizer tray 300 may be selectively positionable in one of a plurality of rotational positions, such as in some embodiments at least three rotational positions. For example, each organizer tray 300 may in some embodiments be selectively positioned in a rear position (see FIGS. 2 through 6, an intermediate position (see FIGS. 5 and 7 through 8), or a forward position (see FIGS. 5 and 9 through 10).

Each organizer tray 300 may include a main body 302. Main body 302 may, for example, include a base wall 304, a first sidewall 306, a second sidewall 308, a front wall 310, and a rear wall 312. First sidewall 306 and second sidewall 308 may be spaced apart along the lateral axis 104. Front wall 310 and rear wall 312 may be spaced apart (such as along tan axis transverse to the lateral axis 104). Openings 213 may be defined in the rear wall 312, such that cables 42 or transmission elements enter or exit an interior 314 of the organizer tray 300 through the rear wall 312 (e.g. through the openings 213).

Each organizer tray 300 may further include one or more features for guiding and retaining cables 142 or transmission elements as they are routed through and within the organizer trays 300. For example, one or more routing channels 320 may be defined in the interior 314. A routing channel 320 may, for example, be defined at the front wall 310 and/or rear wall 312. Further, such routing channels 320 may extend to be defined at neighboring portions of the first sidewall 306 and/or second sidewall 308. Additionally or alternatively, one or more routing channels 320 may be defined between neighboring module mounting locations, as discussed herein.

Additionally or alternatively, retainer tabs 322 may extend into the interior 314 and, in some embodiments, into one or more routing channels 320, from the first sidewall 306, second sidewall 308, front wall 310, rear wall 312, and/or internal walls defining the routing channels 320 to guide and retain such cables 42 or transmission elements thereof.

Figure 4:
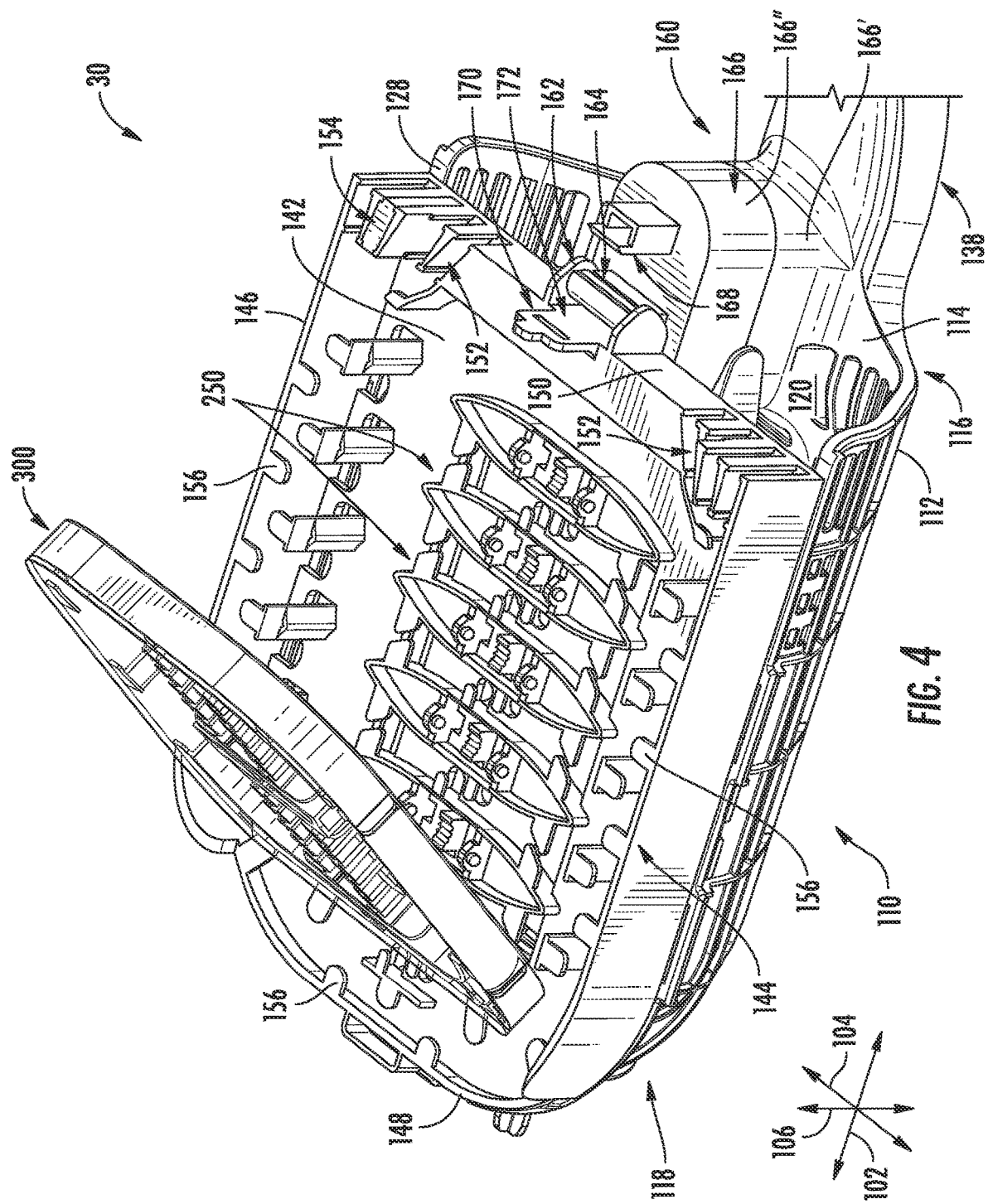
FIG. 4 is a top perspective view of an organizer assembly, with organizer trays removed to illustrate positioning assemblies, in accordance with embodiments of the present disclosure.

As discussed, and with reference specifically to FIG. 4, backplate 140 may include a plurality of positioning assemblies 250. The positioning assemblies 250 may, for example, be disposed in a linear array which extends along the longitudinal axis 102 when the backplate 140 is in the closed position. The positioning assemblies 250 may be disposed on the base wall 142. Each organizer tray 300 may be rotatably connected to the backplate 140 at one of the plurality of positioning assemblies 250. Further, each positioning assembly 250 may cause a connected organizer tray 300 to be selectively positionable in one of a plurality of rotational positions, such as a rear, intermediate, or forward position as discussed herein.

Each positioning assembly 250 may, for example, include one or more connector protrusions 252 which are insertable into depressions 254 defined in an associated organizer tray 300. Such depressions 254 may, for example, be defined in arms 256 which extend from the body 302 of the organizer tray 300, such as from or at the rear wall 312. The interaction between the depressions 254 and protrusions 252 may rotatably connect the organizer trays 300 to the positioning assemblies 250.

Figure 6:
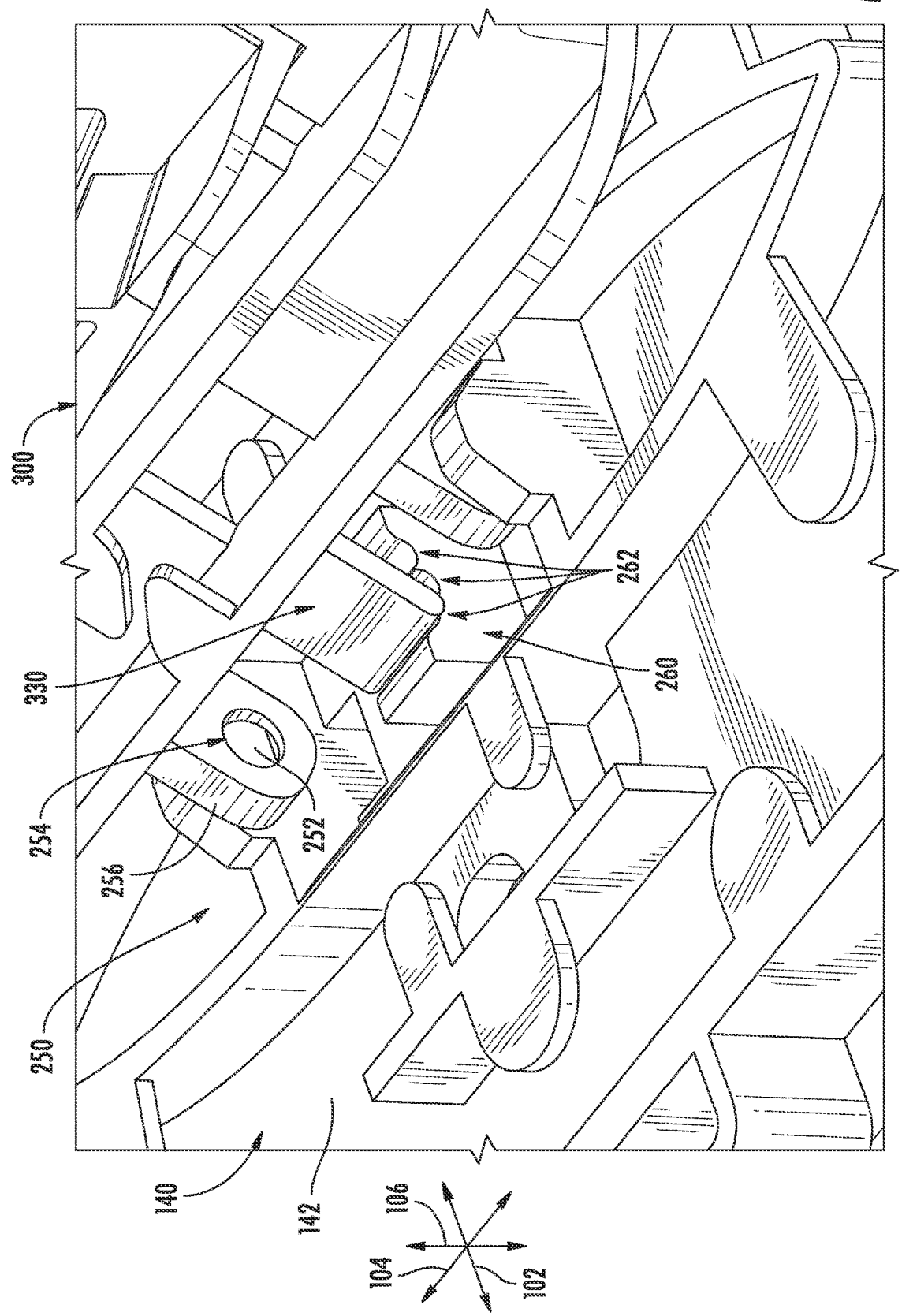
FIG. 6 illustrates an organizer assembly interacting with an associated positioning assembly to be selectively positioned in a rear position, in accordance with embodiments of the present disclosure.
Figure 7:
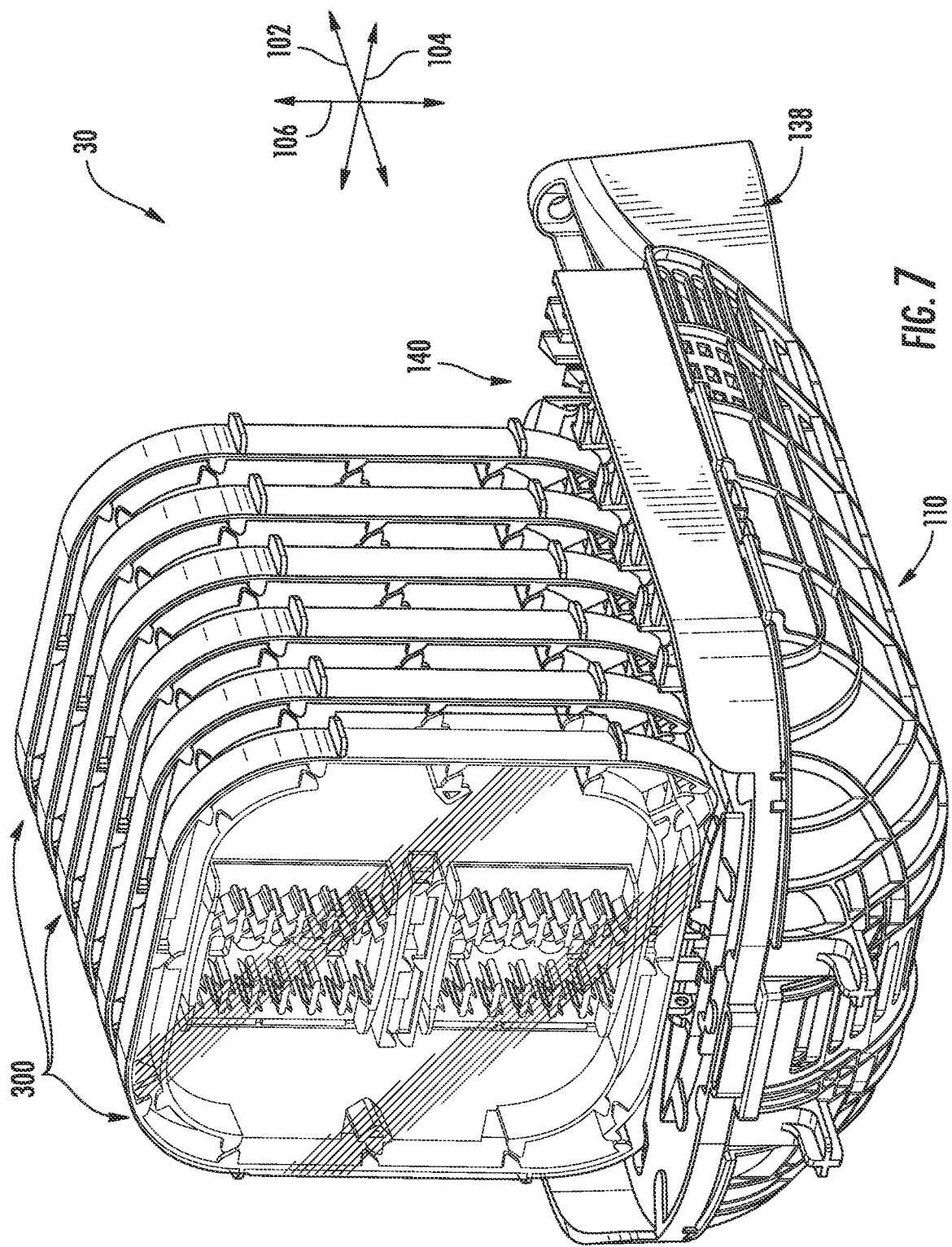
FIG. 7 is a front perspective view of an organizer assembly, with a backplate in a closed position and a plurality of organizer trays in intermediate positions, in accordance with embodiments of the present disclosure.
Figure 8:
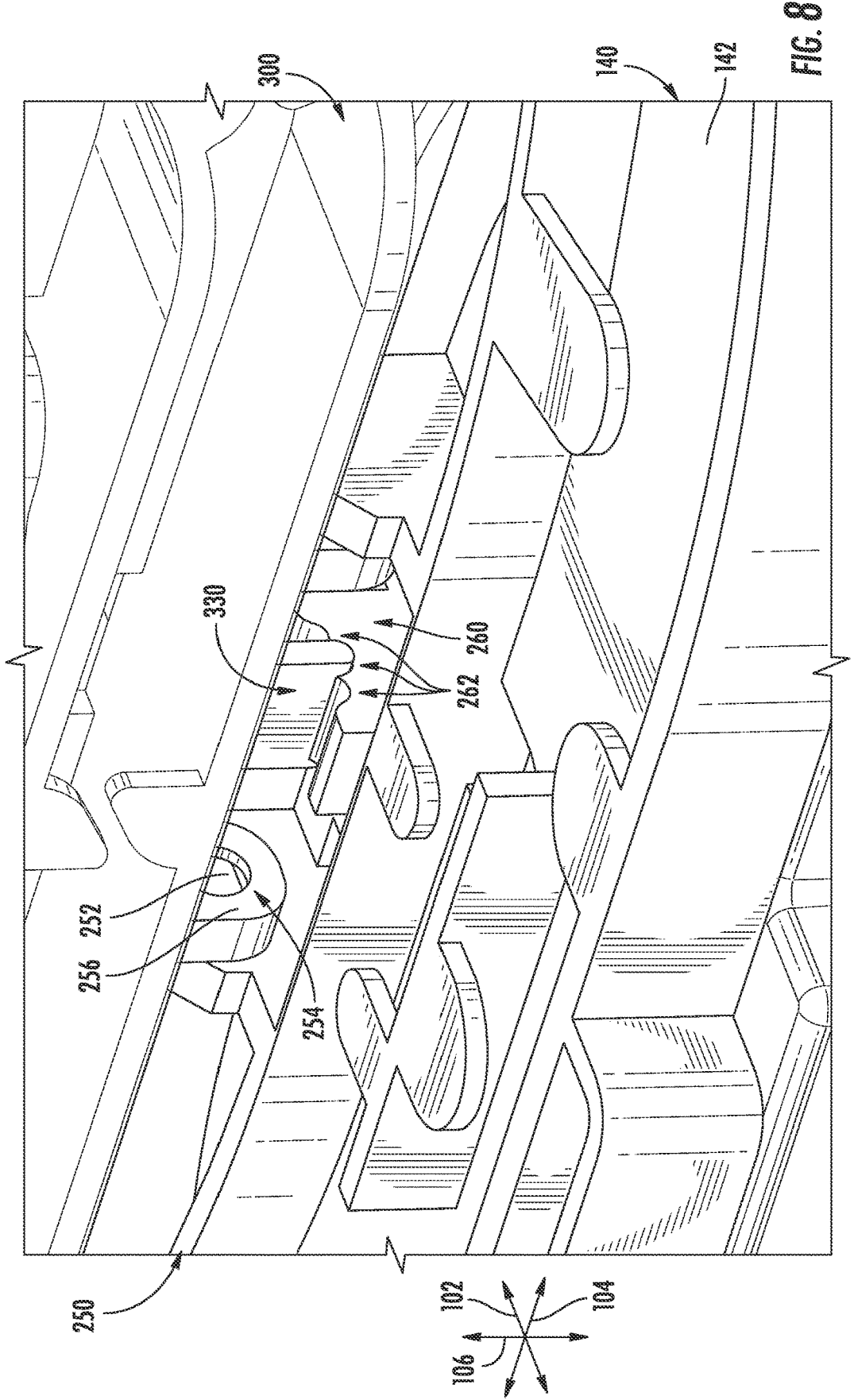
FIG. 8 illustrates an organizer assembly interacting with an associated positioning assembly to be selectively positioned in an intermediate position, in accordance with embodiments of the present disclosure.
Figure 9:
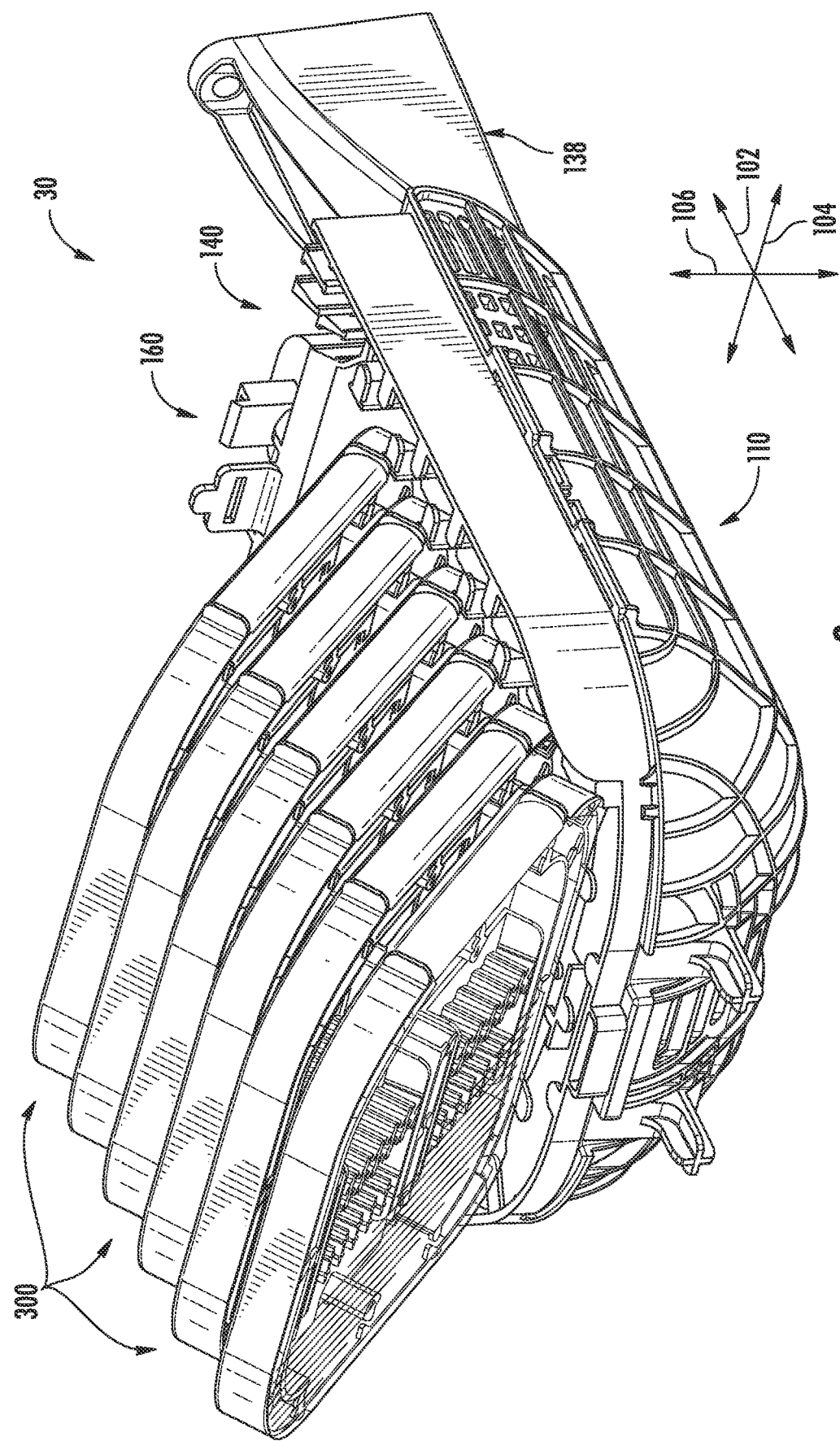
FIG. 9 is a front perspective view of an organizer assembly, with a backplate in a closed position and a plurality of organizer trays in forward positions, in accordance with embodiments of the present disclosure.

Each positioning assembly 250 may, for example, include a channel block 260 which defines a plurality of channels 262. Each channel 262 may correspond to one of the plurality of rotational positions in which a connected organizer tray 300 may be positioned. The channels 262 may, for example, each extend along the lateral axis 104. Further, the channels 262 may be disposed in a linear array which extends along the longitudinal axis 102 when the backplate is in the closed position. Each organizer tray 300 may include a positioning tab 330. The positioning tab 330 may, for example, extend from the body 302 of the organizer tray 300, such as from or at the rear wall 312. A positioning tab 330 of an organizer tray 300 may be selectively insertable into one of the plurality of channels 262 in a channel block 260 of an associated positioning assembly 250. Insertion of the positioning tab 330 into one of the plurality of channels 262 may correspond with selective positioning of the organizer tray 300 in one of the plurality of positions. For example, FIG. 6 illustrates positioning tab 330 inserted in a forward channel 262, which corresponds to selective positioning of the associated organizer tray 300 in a rear position. FIG. 8 illustrates positioning tab 330 inserted in an intermediate channel 262, which corresponds to selective positioning of the associated organizer tray 300 in an intermediate position. FIG. 10 illustrates positioning tab 330 inserted in an rear channel 262, which corresponds to selective positioning of the associated organizer tray 300 in a forward position.

Figure 14:
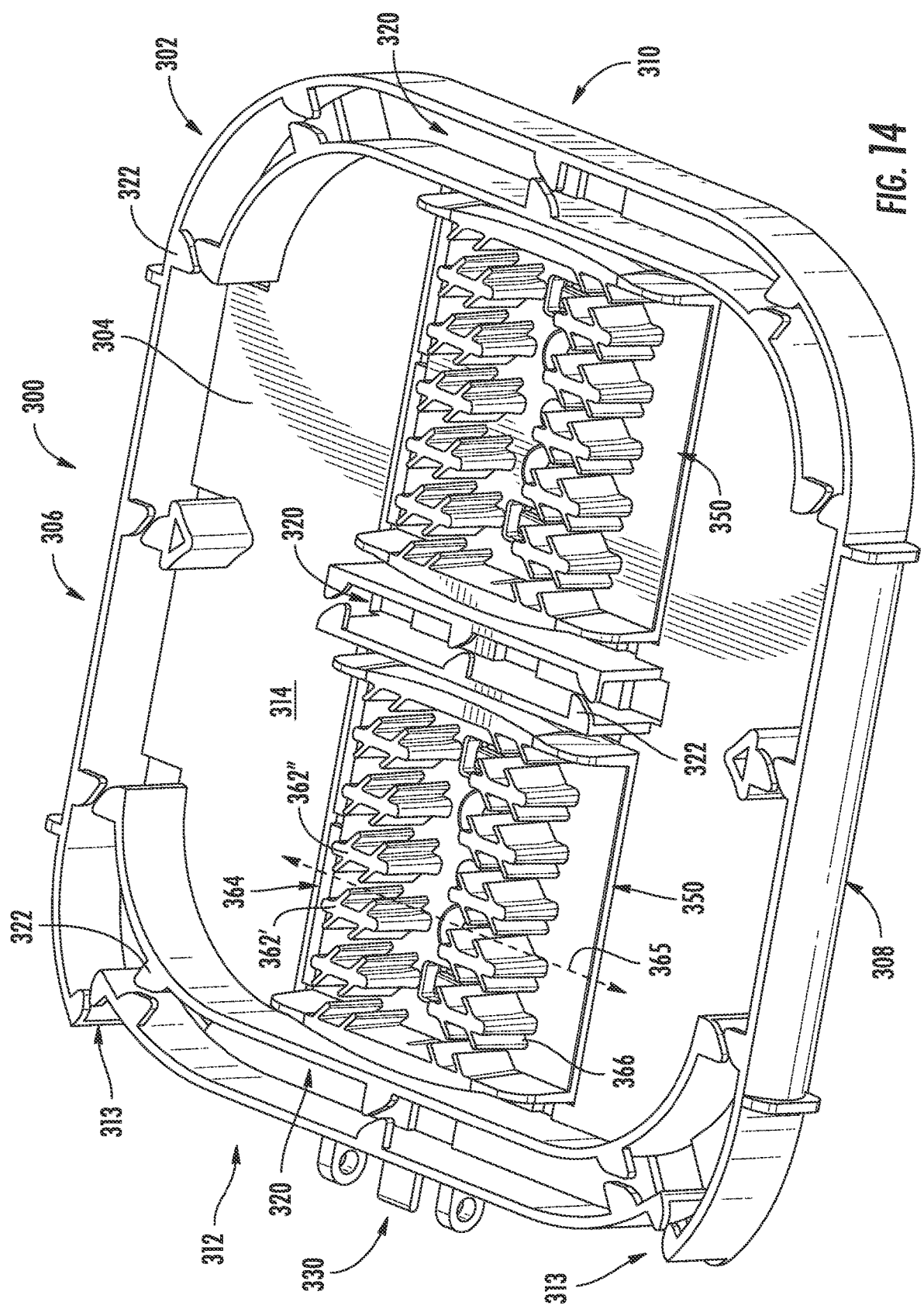
FIG. 14 is a perspective view of an organizer tray with splice modules installed therein in accordance with embodiments of the present disclosure.
Figure 15:
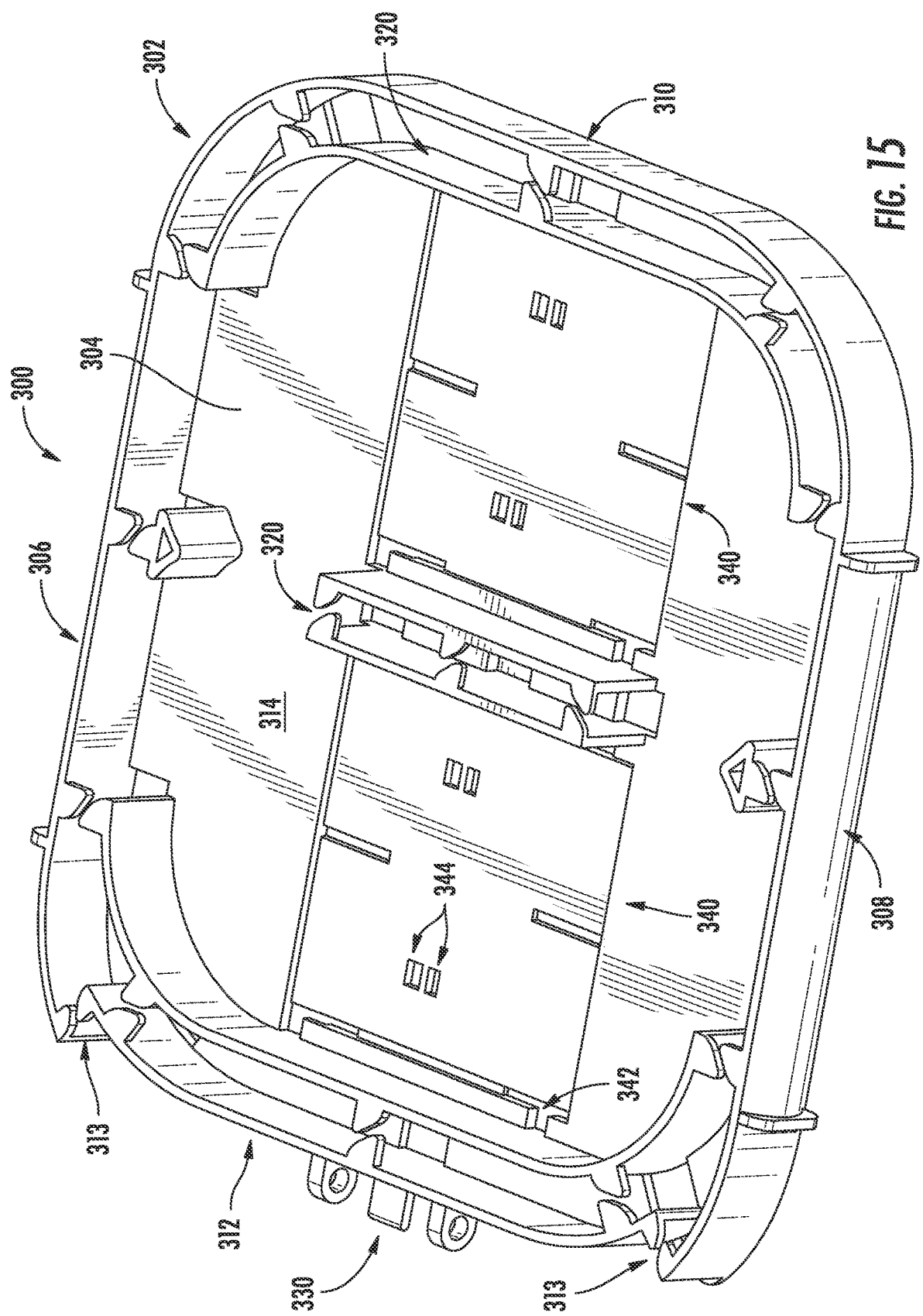
FIG. 15 is a perspective view of an organizer tray with splice modules removed in accordance with embodiments of the present disclosure.
Figure 16:
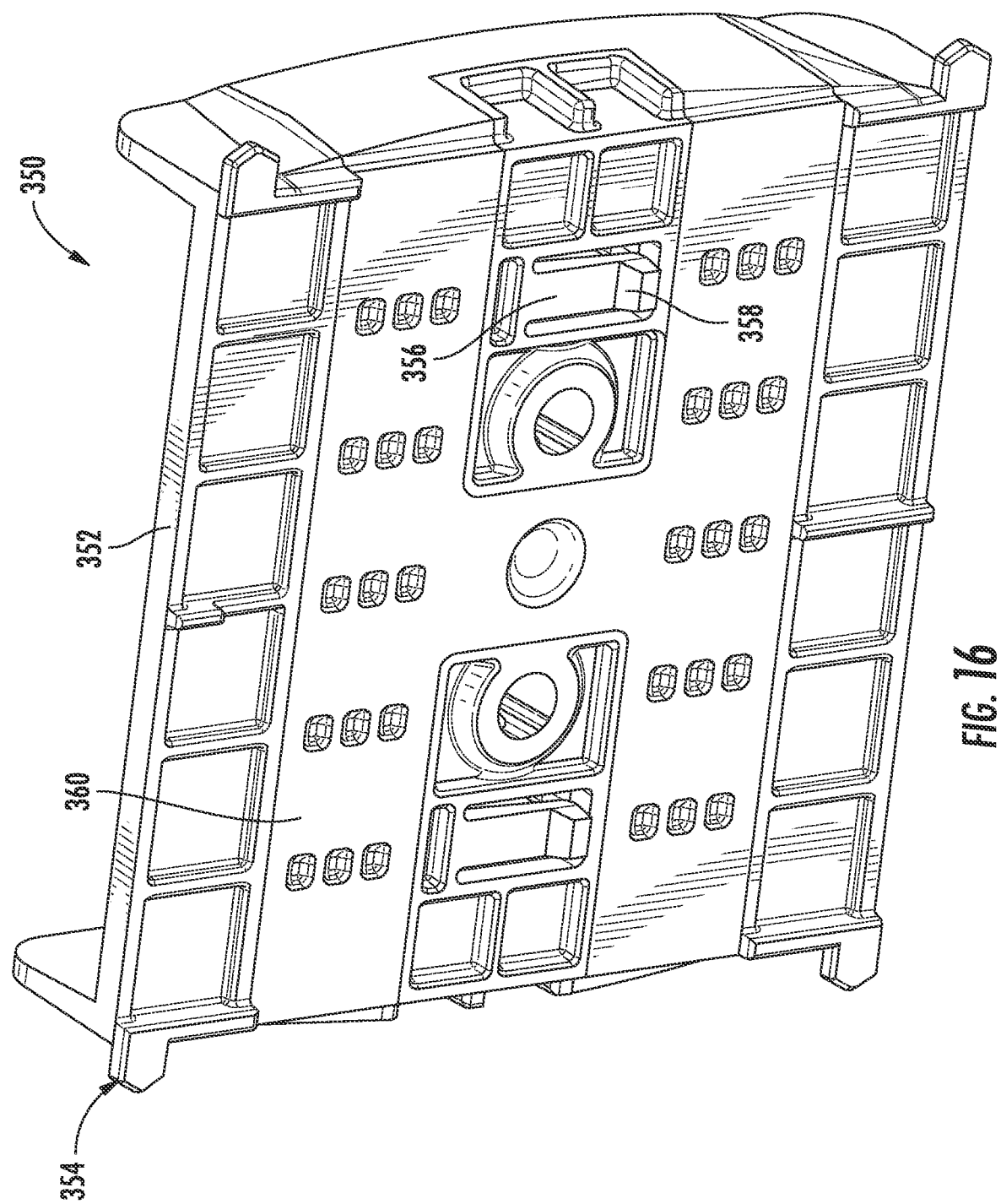
FIG. 16 is a bottom perspective view of a splice module in accordance with embodiments of the present disclosure.

Referring now in particular to FIGS. 14 through 16, each organizer tray 300 may generally accommodate one or more splice modules 350. Each splice module 350 may be removable connected to the organizer tray 300, such as to the base wall 304 thereof. For example, base wall 304 may include a plurality of module mounting locations 340. In exemplary embodiments as shown, the module mounting locations 340 may be aligned in a linear array, and a routing channel 320 may be defined between neighboring mounting locations 340 in the linear array.

In exemplary embodiments, each of the module mounting locations 340 may include a plurality of leg slots 342 which may be defined through the base wall 304 and one or more pluralities of positioning slots 344 which may be defined through the base wall 304. The leg slots 342 may, for example, define at least a portion of a periphery of the module mounting location 340, and may for example, be disposed at corners of the module mounting location 340. Each plurality of positioning slots 344 may be defined within the periphery of the module mounting location 340, and may for example extend in a linear array. The leg slots 342 and positioning slots 344 may generally facilitate removable connection of a splice module 350 to the organizer tray at a module mounting location 340.

Each splice module 350 may, for example, include a base 352 and a plurality of legs 354 extending from the base 352, such as below the base 352 as shown. The legs 354 may further extend from and at least partially define a periphery of the base 352, and may further be disposed at corners of the base 352. To removably connect a splice module 350 to an organizer tray 300 at a module mounting location 340, each leg 354 may be inserted into one of the leg slots 342 of a module mounting location 340. Further, a splice module 350 may include one or more cantilevered arms 356 extending from the base 352, such as below the base 352 as shown. Each cantilevered arm 356 may include a tab 358 at a distal end thereof. To removably connect a splice module 350 to an organizer tray 300 at a module mounting location 340, the cantilevered arm 356, such as the tab 358 thereof, may be inserted in one of a plurality of positioning slots 344 of a module mounting location 340.

In exemplary embodiments, a splice module 350 may be removably connectable to an organizer tray 300, such as at a module mounting location 340, in multiple different orientations. For example, the plurality of positioning slots 344 may be oriented such that the cantilevered arm 356, such as the tab 358 thereof, may be inserted in a different one of a plurality of positioning slots 344 depending on the orientation of the splice module 350.

Splice modules 350 in accordance with the present disclosure may advantageously be dual material components. For example, splice modules 350 may further include one or more overmolded portions 360 which are disposed on portions of the base 352, such as on a lower surface and sidewalls thereof. The overmolded portions 360 advantageously provide improved structural integrity, rigidity, and protection. The base 352, as well as the legs 354 and cantilevered arms 356 thereof, may for example, be formed from a hard plastic such as polycarbonate or nylon. The overmolded portions 360 may be formed from suitable elastomers, such as vulcanized elastomers.

Splice modules 350 in accordance with the present disclosure may further include a plurality of partitions 362, each of which may extend from the base 352. The partitions 362 may be generally parallel to each other, and neighboring partitions 362 may define channels 364 therebetween. Each channel 364 may define and extend along a longitudinal channel axis 365, as shown. Further, one or more arms 366 may extend from one or more of the neighboring partitions 362 into one or more of the channels 364 defined by such neighboring partitions 362. Such arms 366 may extend into the channels 364 at an angle to the longitudinal channel axis 365, as shown. For example, a first partition 362' of neighboring partitions 362 may include one or more arms 366 extending into a channel 364 defined by the neighboring partitions 362, and a second partition 362" of neighboring partitions 362 may include one or more arms 366 extending into the channel 364 defined by the neighboring partitions 362. Further, in exemplary embodiments as shown, the one or more arms 366 extending into a channel 364 from a first partition 362' may extend in a direction opposite the direction of the one or more arms 366 extending into the channel 364 from a second partition 362".

In exemplary embodiments, partitions 362 and arms 366 of splice modules 350 may be formed from suitable elastomers, such as vulcanized elastomers.

Splice modules 350 in accordance with the present disclosure, and in particular the configuration of the partitions 362 and arms 366, are particularly advantageous due to their versatility and flexibility in accommodating various components. For example, a channel 364 of a splice module 350 may be capable of holding triple-stacked single spliced transmission elements, double-stacked ribbon spliced transmission elements, mechanical splices, splitter modules from 1:2 to 1:32, PLCs, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An organizer assembly for a butt closure, the organizer assembly defining a mutually orthogonal coordinate system comprising a longitudinal axis, a lateral axis, and a transverse axis, the organizer assembly comprising:

a primary basket extending along the longitudinal axis between a first open end and a second closed end, the primary basket defining an interior;

a backplate extending between a front wall and a rear wall, wherein a plurality of entry/exit slots are defined at the rear wall, the backplate further comprising a plurality of positioning assemblies;

a hinge assembly connecting the backplate to the primary basket, wherein the backplate is rotatable relative to the primary basket at the hinge assembly about the lateral axis;

a plurality of organizer trays, each of the plurality of organizer trays rotatably connectable to the backplate at one of the plurality of positioning assemblies, wherein each of the plurality of positioning assemblies causes the connected one of the plurality of organizer trays to be selectively positionable in one of a plurality of rotational positions.

2. The organizer assembly of claim 1, wherein each of the plurality of organizer trays is selectively positionable in at least three rotational positions.

3. The organizer assembly of claim 1, wherein each of the plurality of positioning assemblies comprises a channel block defining a plurality of channels, and wherein each of the plurality of organizer trays comprises a positioning tab selectively insertable into one of the plurality of channels in the channel block of the connected positioning assembly.

4. The organizer assembly of claim 1, wherein each of the plurality of organizer trays is rotatable about the lateral axis.

5. The organizer assembly of claim 1, wherein the backplate is positioned above the primary basket along the transverse axis.

6. The organizer assembly of claim 1, wherein the hinge assembly comprises a latch which rotatably receives an axle of the backplate, and wherein the hinge assembly further comprises a catch which is selectively insertable into a slot of the backplate.

7. The organizer assembly of claim 6, wherein the backplate is selectively positionable in a closed position wherein the backplate contacts the primary basket and an open position wherein the catch is inserted in the slot.

8. The organizer assembly of claim 1, wherein the backplate is selectively positionable in one of a plurality of rotatable positions.

9. The organizer assembly of claim 1, further comprising a plug removably inserted into one of the plurality of entry/exit slots, and wherein the plug is formed from a rubber.

10. The organizer assembly of claim 1, further comprising a secondary basket rotatably connectable to the hinge assembly below the backplate along the transverse axis.

11. The organizer assembly of claim 1, wherein a secondary basket comprises a catch arm selectively insertable into a slot defined in the hinge assembly.

12. The organizer assembly of claim 1, wherein each of the plurality of organizer trays comprises a plurality of module mounting locations aligned in a linear array and further comprises a routing channel defined between neighboring module mounting locations of the plurality of module mounting locations.

13. The organizer assembly of claim 1, further comprising a plurality of splice modules removably connected within each of the plurality of organizer trays, each of the plurality of splice modules comprising a base and a plurality of partitions extending from the base, neighboring partitions of the plurality of partitions defining channels therebetween, each channel defining a longitudinal channel axis, and further comprising one or more arms extending from each neighboring partition into each channel defined by the neighboring partition at an angle to the longitudinal channel axis, wherein the one or more arms extending into a channel from a first partition of the neighboring partitions extend in a direction opposite the direction of the one or more arms extending into the channel from a second partition of the neighboring partitions.

14. The organizer assembly of claim 1, further comprising a plurality of splice modules removably connected within each of the plurality of organizer trays, each of the plurality of splice modules including one or more overmolded portions.

15. An organizer assembly for a butt closure, the organizer assembly defining a mutually orthogonal coordinate system comprising a longitudinal axis, a lateral axis, and a transverse axis, the organizer assembly comprising:

a primary basket extending along the longitudinal axis between a first open end and a second closed end, the primary basket defining an interior;

a backplate extending between a front wall and a rear wall, wherein a plurality of entry/exit slots are defined at the rear wall;

a hinge assembly connecting the backplate to the primary basket, wherein the backplate is rotatable relative to the primary basket at the hinge assembly about the lateral axis and selectively positionable in one of a plurality of rotatable positions;

a plurality of organizer trays, each of the plurality of organizer trays rotatably connectable to the backplate and rotatable about the lateral axis.

16. The organizer assembly of claim 15, wherein each of the plurality of organizer trays is selectively positionable in at least three rotational positions.

17. The organizer assembly of claim 15, wherein the backplate further comprises a plurality of positioning assemblies, each of the plurality of positioning assemblies comprising a channel block defining a plurality of channels, and wherein each of the plurality of organizer trays comprises a positioning tab selectively insertable into one of the plurality of channels in the channel block of the connected positioning assembly.

18. The organizer assembly of claim 15, wherein the backplate is positioned above the primary basket along the transverse axis.

19. The organizer assembly of claim 15, wherein the hinge assembly comprises a latch which rotatably receives an axle of the backplate, and wherein the hinge assembly further comprises a catch which is selectively insertable into a slot of the backplate.

20. The organizer assembly of claim 15, wherein each of the plurality of organizer trays comprises a plurality of module mounting locations aligned in a linear array and further comprises a routing channel defined between neighboring module mounting locations of the plurality of module mounting locations.

* * * * *